May 31, 1949.  J. E. MAYNARD ET AL  2,471,980
DAMPER
Filed May 1, 1945  2 Sheets-Sheet 1
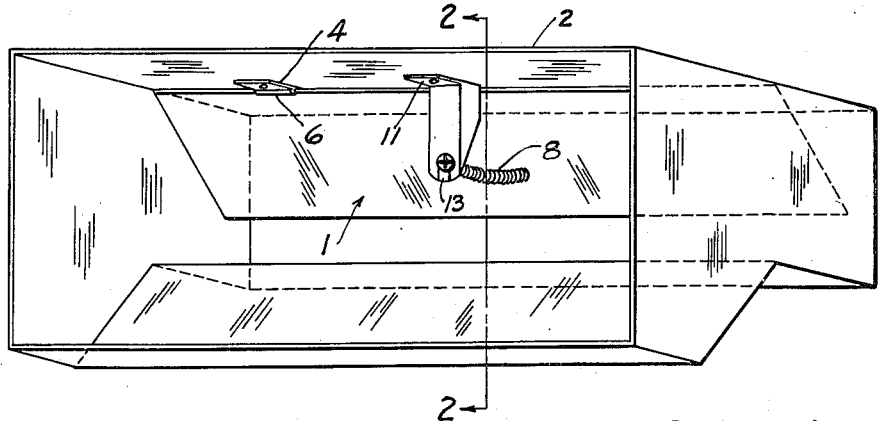
Fig. 1
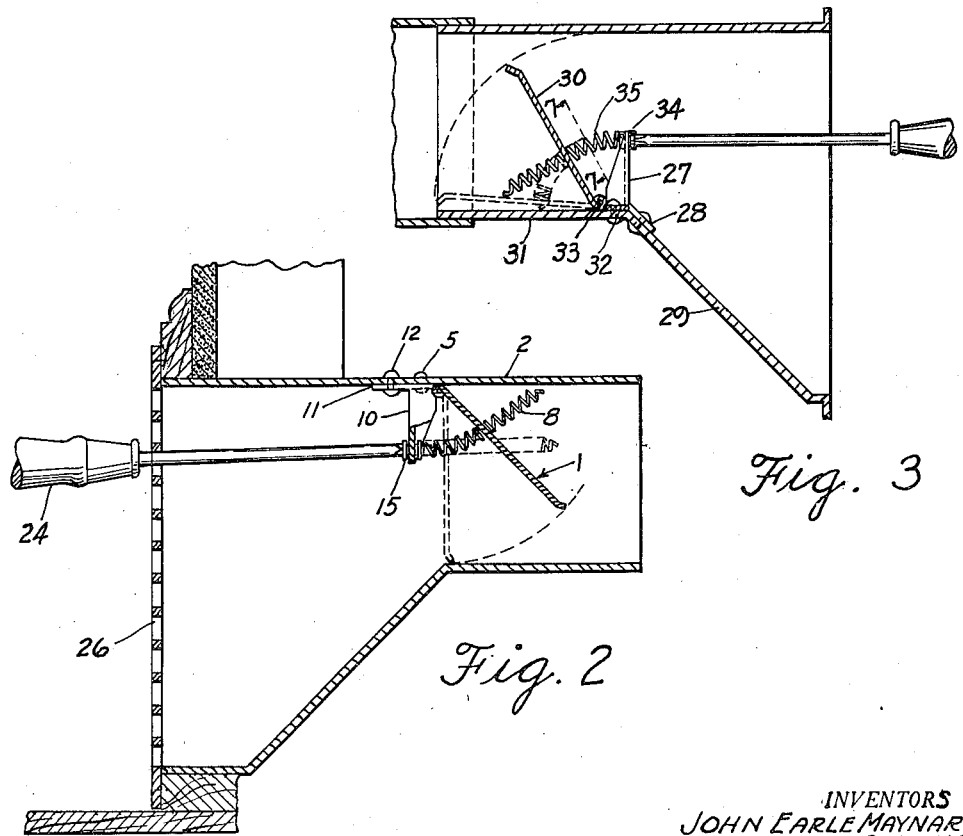
Fig. 3
Fig. 2
INVENTORS
JOHN EARLE MAYNARD
AND PAUL O. COLLINS
BY
John Mahoney
ATTORNEY May 31, 1949.   J. E. MAYNARD ET AL   2,471,980
DAMPER Filed May 1, 1945   2 Sheets-Sheet 2

INVENTORS.
JOHN EARLE MAYNARD
AND PAUL O. COLLINS
BY John Mahoney
ATTORNEY

Patented May 31, 1949

2,471,980

UNITED STATES PATENT OFFICE 2,471,980

DAMPER

John E. Maynard, Detroit, Mich., and
Paul O. Collins, Elyria, Ohio

Application May 1, 1945, Serial No. 591,278

9 Claims. (Cl. 98—106)

Our invention relates to dampers and more particularly to an improved damper for use in air conditioning or heating systems.

In Patent No. 2,284,912 granted jointly to us on June 2, 1942, an improved type of damper construction is disclosed for use in air conditioning systems and the like that introduces a static pressure and an extended plenum chamber in a stackhead or air outlet in advance of the damper.

It is the purpose of the present invention to provide a damper of the type disclosed in the above-mentioned patent that has all the advantages enumerated in that patent but which is formed of a smaller number of parts and consequently is less expensive to manufacture.

Our invention will be better understood by reference to the accompanying drawings in which:

Fig. 1 is a perspective view of a stackhead or duct with our improved damper in place;

Fig. 2 is a cross sectional view on the line 2—2 of Fig. 1 showing the stackhead or duct installed in a position to convey conditioned or heated air to a room, the damper blade being shown in full lines in a partially open position and in dotted lines in closed position;

Fig. 3 is a cross sectional view of another form of our improved damper, the damper blade being shown in full lines in a partially open position and in dotted lines in an almost open position;

Figures 4, 5, 6:
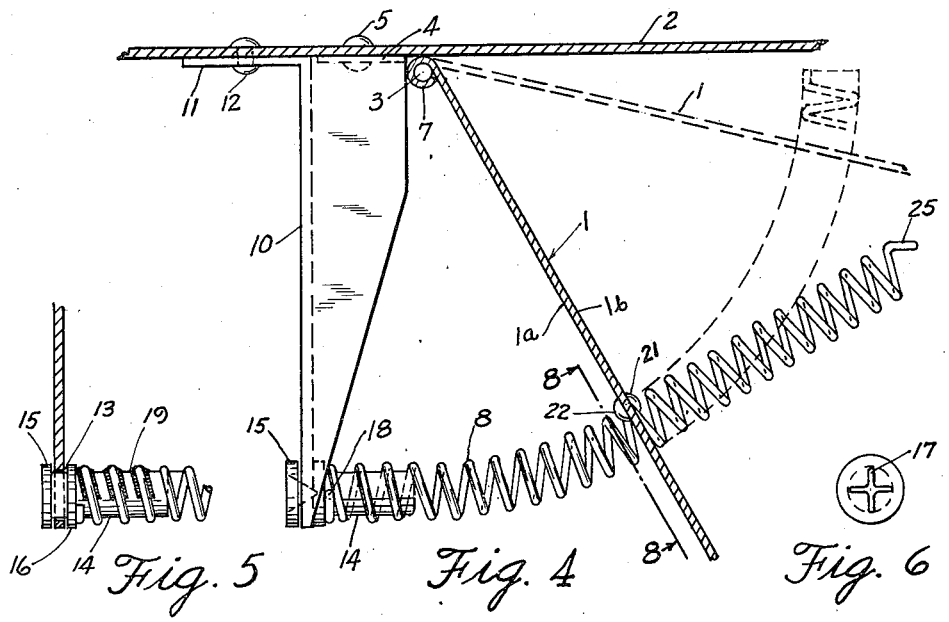
Fig. 4 is an enlarged detail view of the damper shown in Fig. 2 with parts in elevation and parts in section and with the damper blade shown in full lines in a partially open position and in dotted lines in a second position in which the damper blade is almost completely open.
Fig. 5 is an enlarged detail view showing a modified method of attaching the coil spring to the adjusting stud.
Fig. 6 is a plan view of the head of the adjusting stud.
Figure 9:
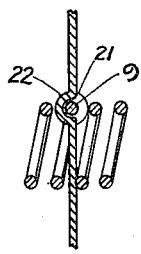
Fig. 9 is a cross sectional view on the line 9—9 of Fig. 8.
Figure 7:
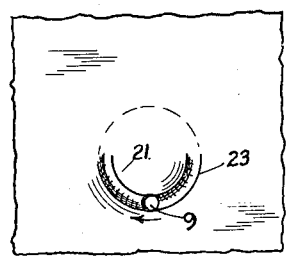
Fig. 7 is a detail view of a portion of the damper blade as seen from a plane passing through the line 7—7 of Fig. 3, looking in the direction of the arrows, with the coil spring omitted.

Our improved damper may be mounted in any suitable duct portion of an air conditioning or heating system, such as a trunk line or a branch line. As illustrated in the drawings, it is incorporated in a horizontally mounted stackhead or duct which may constitute part of either an air conditioning or heating system.

As shown in Figs. 1, 2 and 4, the damper blade 1 is pivotally attached to the upper wall 2 of the stackhead or duct and while any suitable means may be provided for this purpose, as illustrated more particularly in Fig. 4 of the drawing, a rod 3 is maintained adjacent the top wall of the stackhead or duct by means of straps 4, each of which has one end attached to the upper wall of the stackhead or duct by suitable means, such as a rivet 5, and the other end of which is coiled around and serves as a bearing for the rod 3 as indicated by the numeral 6 and one edge of the damper blade has portions cut out to receive the coiled portions of straps 4 and the remaining portion of the upper edge of the damper blade is curled around rod 3 to form a pivoted joint as indicated more particularly by the numeral 7 in Fig. 4 of the drawing.

While the foregoing structure is similar to that disclosed in Patent No. 2,284,912 to which reference has been made, in the present invention improved means are provided to adjust the damper blade to the desired position including a coil spring 8 which is threaded through an aperture 9 in the damper blade and while various means may be provided for supporting spring 8 in position to perform this function, as illustrated in Figs. 1, 2 and 4, a bracket 10 is attached to the upper wall of the stackhead or duct in any desired manner. As shown, the bracket is provided with a laterally extending flange 11 which is riveted or otherwise secured to the upper wall of the stackhead or duct as indicated by the numeral 12 and the free end of the bracket extends downwardly and is provided with a recess or opening 13 to receive a stud 14 to which one end of coil spring 8 is secured. Stud 14 is provided with outer and inner flanges 15 and 16 arranged on opposite sides of bracket 10 and the outer face of flange 15 is provided with means, such as notches 17, to receive a suitable tool for adjusting the stud and while notches 17 may be of any desired form, as illustrated, they are arranged to form a "Phillips" head which requires a special manipulating tool so that the damper blade cannot be adjusted by those unfamiliar with the system.

Spring 8 may be attached to the shank of stud 14 in any desired manner so that the spring will rotate in unison with the stud. For instance, the spring may be wound tightly around the shank of the stud to provide frictional engagement, and if desired, such frictional engagement may be supplemented by providing an aperture in the shank of the stud to receive the free end of the spring which may be bent radially inwardly from the coil as indicated by the numeral 18 in Fig. 4 of the drawing. Another and more positive method of attaching the spring to the shank of the stud is by soldering or welding the spring in place as indicated by the numeral 19 in Fig. 5.

Figure 8:
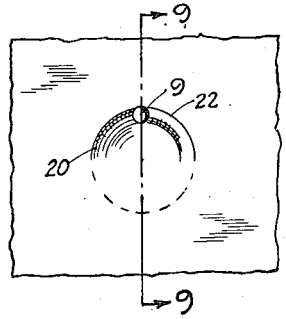
Fig. 8 is a view similar to that shown in Fig. 7 as seen from a plane passing through the line 8—8 of Fig. 4, looking in the direction of the arrows.

To provide a smoothly working damper blade that may be accurately and rapidly adjusted, one side of the damper blade is provided with a depression adjacent to aperture 9 to receive a portion of one of the coils of spring 8 as it approaches the aperture and with an embossment in arcuate alignment therewith through which one end of aperture 9 extends and which provides a groove on the opposite side of the damper blade to receive the spring after it passes through the aperture. The opposite side of the damper blade is of course formed or shaped in the opposite manner, that is, an embossment is formed opposite to the depression and a depression is formed opposite to the embossment and while we do not desire to be limited to the particular shape of such depressions and embossments, as illustrated in the drawings, the depressions on the side 1a of the damper blade is in the form of a groove 20 as illustrated in Fig. 8 which forms an embossment 21 on the opposite side 1b of the damper blade. The groove 20 is in arcuate alignment with an embossment 22 on the side 1a of the damper blade which as shown is substantially U-shaped in cross section and forms a groove 23 on the opposite side 1b of the damper blade. One end of embossment 22 is in abutting relation to one end of groove 20 and the aperture 9 extends through the embossment 22 at the point at which it abuts groove 20.

By providing such an arrangement, it will be apparent that the coil in passing through the damper blade in either direction will first follow the groove on one side of the damper blade and will then pass smoothly through the aperture into the groove on the opposite side of the damper blade, irrespective of the rotative direction of stud 14, and aperture 9 may be formed of such size that the wire forming the spring will substantially fill the aperture, thereby eliminating annoying sound effects.

The damper blade may be adjusted to any desired position by means of a tool 24 to rotate stud 14, as shown in Fig. 2. As will be apparent from the drawings, when stud 14 is rotated in one direction, the metal forming the coils of spring 8 will pass or run smoothly through aperture 9 forcing the damper blade to the dotted line position shown in Fig. 4 and in view of the resilient nature of the metal of which the spring is formed, the spring will bend to assume a shape which varies in accordance with the position of the damper blade and will maintain the blade in any desired stationary position. To prevent disengagement of the spring from the damper blade, the free end of the spring is inclined as indicated by numeral 25 or is otherwise distorted so that it cannot pass through aperture 9. Upon rotating stud 14 in the opposite direction, the damper blade may be moved to closed position and during such movement the spring will gradually bend to change its shape from that shown in dotted lines to the position shown in full lines and then to a substantially horizontally extending shape when the damper is in its fully closed position as shown in Fig. 2. When the stackhead or duct is mounted to lead to a room of a building as shown in Fig. 2, the damper may be adjusted to the desired position by inserting the shank of the tool through a grill 26.

Another modification of our improved damper construction is shown in Fig. 3 of the drawing. In this modification, the bracket 27 is provided with a flange 28 which is riveted or otherwise affixed to wall 29 of the stackhead or duct and the damper blade 30 is affixed to the bottom wall 31 by strap hinges 32 having their free end riveted or otherwise secured to wall 31 and the opposite ends curled to form a bearing for a rod 33 upon which one edge of the damper blade 30 is pivotally mounted in the same manner as shown in Fig. 4. The stud 34 is mounted in a recess or opening in bracket 27 and one end of spring 35 is attached thereto in the same manner as shown in Fig. 4 and the dotted lines indicate the position the spring assumes when the damper blade is moved from its partially open position as shown in full lines to its almost completely open position as shown in dotted lines.

Other modifications of our improved damper construction and its arrangement in stackheads or ducts, whether of the horizontal or vertical stackhead type, will of course be apparent to those skilled in the art and it will be understood that we contemplate by the appended claims to cover any such modifications as fall within the true purpose and scope of our invention.

What we claim is:

1. Apparatus for controlling the flow of air in a stackhead or duct including a damper blade having a portion shaped to provide on one side a groove and an embossment in arcuate abutting alignment, each of which is substantially U-shaped in cross section and a similarly shaped groove and embossment on the other side of said blade which are opposite, respectively, to the embossment and groove on the first mentioned side, and said blade being provided with an aperture which extends through the end of the embossment adjacent the groove on one side of said blade, a coil spring having a portion of one of its coils arranged in the depression on one side of said blade and being threaded through said aperture and another portion of its coil arranged in the depression on the opposite side of said blade, and means whereby said spring may be rotated to adjust the position of said blade.

2. Apparatus for controlling the flow of air in a stackhead or duct including a damper blade provided with an aperture, means for pivotally mounting said blade in said stackhead and said blade being adjustable to different positions, means for adjusting the position of said blade including rotatable means and a coil spring, said coil spring being threaded through the aperture in said blade and terminating in a free end and its opposite end being secured to said rotatable means and being rotatable therewith, means for supporting said rotatable means, and said blade being shaped to provide a depression on one side leading to said aperture and a depression on the opposite side leading from said aperture so that during rotation of said rotatable means and said spring the metal forming the coils of said spring will pass smoothly through said aperture.

3. Apparatus for controlling the flow of air in a stackhead or duct including a damper blade pivotally mounted at one of its edges to a wall of said stackhead, one side of said damper being provided with a depression and an aligned embossment and the opposite side being provided with an aligned embossment and depression arranged oppositely to the depression and embossment, respectively, of the first mentioned side, and said blade being provided with an aperture between the depression and embossment on one side, means for adjusting the position of said blade including rotatable means and a coil spring, said coil spring extending through the aperture in said blade and being provided with a free end and its opposite end being secured to said rotatable means and being rotatable therewith, means for supporting said rotatable means, and said coil spring having a portion of one of its coils arranged in the depression on one side of said blade and extending through said aperture into the depression on the other side of said blade to pass smoothly through said aperture during the rotation of said spring, and the metal of which the coils of said spring is formed being of sufficient size to substantially fill the aperture to thereby substantially prevent the passage of air through the aperture.

4. Apparatus for controlling the flow of air in a stackhead or duct including a damper blade provided with an aperture, and having a depression on one side leading to said aperture and a depression on the other side leading from said aperture, means for pivotally mounting said blade in said stackhead and said blade being adjustable to different positions, means for adjusting the position of said blade including rotatable means and a coil spring, said coil spring being threaded through the aperture in said blade and terminating in a free end and its opposite end being secured to said rotatable means, and means for supporting said rotatable means, the metal of which the coils of said spring is formed being of sufficient size to substantially fill the aperture in said blade to thereby substantially prevent the passage of air through said aperture and said spring being sufficiently flexible to bend a sufficient amount during movement of said blade to permit said blade to be freely moved between its open and closed positions.

5. Apparatus for controlling the flow of air in a stackhead or duct including a damper blade movable from an open to a closed position, means in said stackhead for pivotally mounting said blade along one of its edges to one of the walls of said duct and said blade being provided with an aperture, and having a depression on one side leading to said aperture and a depression on the other side leading from said aperture, a bracket secured to and extending substantially perpendicular to the same wall to which said damper is pivoted, said bracket being provided with an opening at its free end and being arranged substantially parallel to said blade when the blade is in its closed position, means arranged in said opening and supported by said bracket, and a coil spring threaded through said aperture having one end free and the other end secured to said means and the metal of which said coil spring is formed being of a size to substantially fill the aperture in said blade to thereby substantially prevent the passage of air through the aperture, said means being rotatable in opposite directions to force the coil spring through said aperture in said blade to adjust the blade to different positions and said coil spring being sufficiently flexible to bend a sufficient amount during movement of said blade to permit said blade to be freely moved between its closed and open positions.

6. Apparatus for controlling the flow of air in a stackhead or duct having an open end, including a damper blade movable from a closed to an open position, said blade being pivotally mounted at one of its edges to one of the walls of said stackhead and being provided with an aperture, and having a depression on one side leading to said aperture and a depression on the other side leading from said aperture, a bracket secured to the same wall to which said damper is pivoted and extending substantially perpendicular from said wall into said stackhead, said bracket being arranged substantially parallel to said blade when said blade is in closed position and being provided with an opening at its free end, means arranged in said opening and supported by said bracket, said means having a recess facing toward the open end of said stackhead, a coil spring threaded through the aperture in said blade and having one end free and the other end secured to said means and the aperture in said blade being so arranged that the coil spring is substantially in alignment with the axis of said means when said blade is in closed position and said means being rotatable in opposite directions by a tool inserted through the open end of said stackhead and engaged in the recess of said means to force the coil spring through the aperture in said blade to adjust the blade to a closed, a partially open, or a fully opened position and said spring being sufficiently flexible to bend a sufficient amount during the movement of said blade to permit said blade to be freely moved between its closed and open positions.

7. Apparatus for controlling the flow of air in a stackhead or duct including a damper blade provided with an aperture, means within said stackhead for pivotally mounting one of the edges of said blade adjacent one of the walls of said stackhead and said blade being adjustable to different positions, means for adjusting the position of said blade including rotatable means and a coil spring, said coil spring being threaded through the aperture in said blade and terminating in a free end and its opposite end being secured to said rotatable means and being rotatable therewith, means for supporting said rotatable means, and said blade being shaped to provide a depression on one side leading to said aperture and a depression on the opposite side leading from said aperture so that during rotation of said means and said spring the metal forming the coils of said spring will pass smoothly through said aperture.

8. Apparatus for controlling the flow of air in a stackhead or duct having an open end, including a damper blade movable from a closed to an open position, said blade being pivotally mounted in said stackhead and being provided with an aperture, and having a depression on one side leading to said aperture and a depression on the other side leading from said aperture, a bracket secured to a wall of said stackhead and extending substantially perpendicular from said wall into said stackhead, said bracket being provided with an opening at its free end, means arranged in said opening and supported by said bracket, said means having a recess arranged perpendicular to the open end of said stackhead, a coil spring threaded through the aperture in said blade and having one end free and the other end secured to said means and the metal of which the coils of said spring is formed being of sufficient size to substantially fill the aperture in said blade to thereby substantially prevent the passage of air through said aperture, and said means being rotatable in opposite directions by a tool inserted through the open end of said stackhead and engaging in the recess of said means to force the coil spring through the aperture in said blade to adjust the blade to a closed, a partially open, or a fully opened position and said spring being sufficiently flexible to bend a sufficient amount during movement of said blade to permit said blade to be freely moved between its closed and open positions.

9. Apparatus for controlling the flow of air in a stackhead or duct having an open end, including a damper blade movable from a closed to an open position, said blade being pivotally mounted in said stackhead and provided with an aperture, a bracket secured to a wall of said stackhead and extending substantially perpendicular from said wall into said stackhead, said bracket being provided with an opening at its free end, means arranged in said opening and supported by said bracket, said means having a recess facing toward the open end of said stackhead, a coil spring threaded through the aperture in said blade and having one end free and the other end secured to said means, said means being rotatable in opposite directions by a tool inserted through the open end of said stackhead and engaging in the recess of said means to force the coil spring through the aperture in said blade to adjust the blade to a closed, a partially open, or a fully open position, said blade being shaped to provide a depression on one side leading to said aperture and a depression on the opposite side leading from said aperture so that during rotation of said means and said spring the metal forming the coils of said spring will pass smoothly through said aperture, and said spring being sufficiently flexible to permit said blade to bend a sufficient amount during movement of said blade to be freely movable between its closed and open positions.

JOHN E. MAYNARD.
PAUL O. COLLINS.

REFERENCES CITED

The following references are of record in the file of this patent:

UNITED STATES PATENTS

| Number | Name | Date |
|---|---|---|
| 711,653 | Burdick | Oct. 21, 1902 |
| 852,063 | Jones | Apr. 30, 1907 |
| 1,062,177 | McElfatrick | May 20, 1913 |
| 1,063,645 | Boles | June 3, 1913 |
| 2,177,931 | Pierson et al. | Oct. 31, 1939 |
| 2,284,912 | Maynard et al. | June 2, 1942 |

FOREIGN PATENTS

| Number | Country | Date |
|---|---|---|
| 3,955 | Sweden | Nov. 19, 1892 |
| 689,188 | France | May 26, 1930 |